(12) United States Patent
Udengaard

(10) Patent No.: US 11,994,632 B2
(45) Date of Patent: May 28, 2024

(54) NEAR SURFACE IMAGING AND HAZARD DETECTION

(71) Applicant: Magseis FF LLC, Houston, TX (US)

(72) Inventor: Carsten Udengaard, Sugar Land, TX (US)

(73) Assignee: Magseis FF LLC, Houston, TX (US)

( * ) Notice: Subject to any disclaimer, the term of this patent is extended or adjusted under 35 U.S.C. 154(b) by 154 days.

(21) Appl. No.: 17/461,738

(22) Filed: Aug. 30, 2021

(65) Prior Publication Data

US 2021/0389437 A1    Dec. 16, 2021

Related U.S. Application Data

(63) Continuation of application No. 15/966,789, filed on Apr. 30, 2018, now Pat. No. 11,105,908.

(51) Int. Cl.
| G01S 7/00 | (2006.01) |
| G01S 7/521 | (2006.01) |
| G01S 15/89 | (2006.01) |
| G01S 15/93 | (2020.01) |

(52) U.S. Cl.
CPC ............ *G01S 7/521* (2013.01); *G01S 15/89* (2013.01); *G01S 15/93* (2013.01)

(58) Field of Classification Search
USPC ........................................................ 367/15
See application file for complete search history.

(56) References Cited

U.S. PATENT DOCUMENTS

| 8,958,266 B2 | 2/2015 | Kragh et al. |
| 11,105,908 B2 * | 8/2021 | Udengaard ............. G01S 7/521 |

| 2010/0002539 A1 | 1/2010 | Kragh et al. |
| 2011/0063947 A1 | 3/2011 | Norris |
| 2012/0020184 A1 | 1/2012 | Wilson et al. |
| 2012/0035854 A1 | 2/2012 | Kragh et al. |
| 2013/0322208 A1 | 12/2013 | Sollner et al. |

(Continued)

FOREIGN PATENT DOCUMENTS

| CN | 102257404 A | 11/2011 |
| CN | 103344991 A | 10/2013 |

(Continued)

OTHER PUBLICATIONS

International Preliminary Report on Patentability for PCT/US2019/029360 dated Nov. 12, 2020 (9 pages).

(Continued)

*Primary Examiner* — James R Hulka
(74) *Attorney, Agent, or Firm* — Sage Patent Group

(57) ABSTRACT

Systems and methods of near surface imaging and hazard detection with increased receiver spacing are provided. The system includes: a first string of one or more acoustic sources, a second string of one or more acoustic sources opposite the first string, a first one or more hydrophones mounted within a predetermined distance of the first string, and a second one or more hydrophones mounted within the predetermined distance of the second string. The first one or more hydrophones records an acoustic shot generated from the first string. The second one or more hydrophones records the acoustic shot and acoustic reflections corresponding to the acoustic shot. The system generates an image from the recorded acoustic shot and the acoustic reflections.

20 Claims, 8 Drawing Sheets

(56) References Cited

U.S. PATENT DOCUMENTS

| | | | |
|---|---|---|---|
| 2015/0076334 A1 | 3/2015 | Kragh et al. | |
| 2016/0299242 A1 | 10/2016 | Nance et al. | |
| 2017/0023690 A1 | 1/2017 | Lee et al. | |
| 2018/0095189 A1 | 4/2018 | Craft et al. | |
| 2019/0331777 A1* | 10/2019 | Udengaard | G01V 1/3861 |

FOREIGN PATENT DOCUMENTS

| | | |
|---|---|---|
| EP | 3 121 623 | 1/2017 |
| GB | 2 441 344 | 3/2008 |
| GB | 2524387 A | 9/2015 |
| WO | WO-2017/160424 | 9/2017 |
| WO | WO-2017/186648 | 11/2017 |

OTHER PUBLICATIONS

International Search Report and Written Opinion of the International Searching Authority on PCT/US2019/029360 dated Jul. 19, 2019 (15 pages).

Non-Final Office Action for U.S. Appl. No. 15/966,789 dated Jun. 25, 2021 (10 pages).

Notice of Allowance for U.S. Appl. No. 15/966,789 dated Jul. 26, 2021 (7 pages).

Office Action mailed Jan. 30, 2024 for Chinese Patent Application No. 201980028593.3, 13 pages.

* cited by examiner

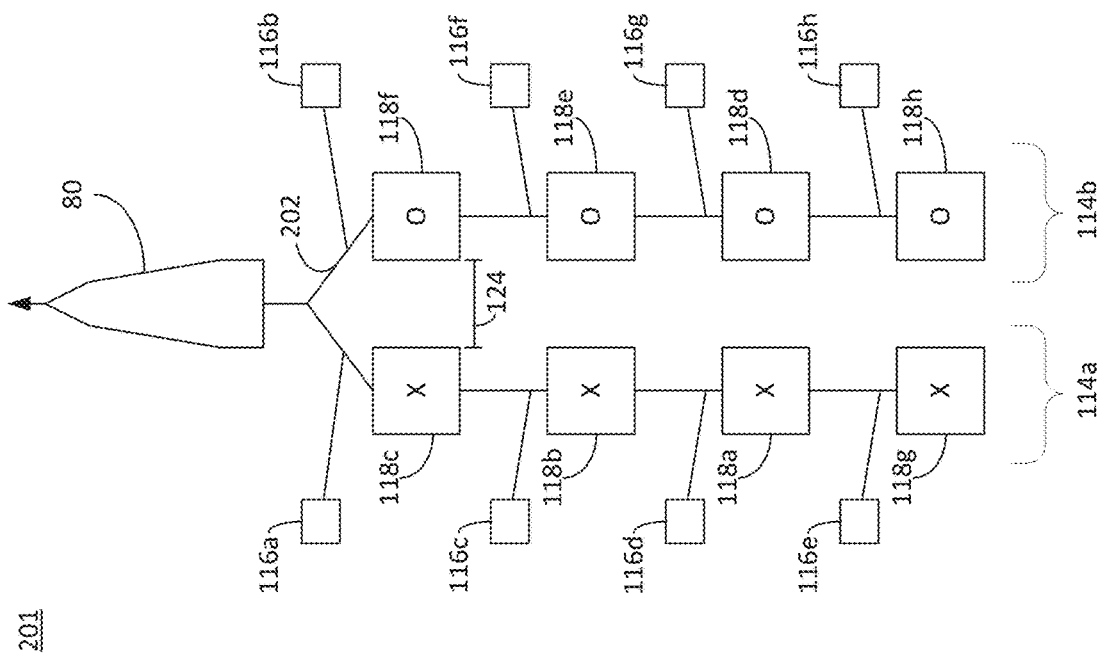

NEAR SURFACE IMAGING AND HAZARD DETECTION

CROSS REFERENCE TO RELATED APPLICATION

This application claims the benefit of priority under 35 U.S.C. § 120 as a continuation of U.S. patent application Ser. No. 15/966,789, filed Apr. 30, 2018 and titled "Near Surface Imaging and Hazard Detection, which is hereby incorporated herein by reference in its entirety.

BACKGROUND

A seismic data acquisition system can acquire seismic data relating to subsurface features, such as lithological formations or fluid layers that may indicate the presence of hydrocarbons, minerals or other elements. An acoustic signal can penetrate the surface of the earth. The acoustic signal can reflect or refract off of subsurface lithological formations. The reflected or refracted acoustic signals can be acquired, analyzed, and interpreted to indicate physical characteristics of, for example, the lithological formations such as the presence of hydrocarbons.

SUMMARY

The present disclosure is directed to systems and methods of near surface imaging and hazard detection with increased receiver spacing. Systems and methods of the present disclosure can use a near field array. The systems and methods of the present disclosure can use a hydrophone located above an array of sources to collect data that can be used to characterize the source, as well as collect data that can be used to generate an image of the subsurface.

Seismic surveys may not be able to capture sufficient data or generate images for certain locations without introducing additional receivers into the array. Having excessive receivers in an array can increase resource utilization, such as increase fuel usage if the receivers are being towed in a streamer configuration, or increase resources associated with deploying receivers on the ocean bottom. Further, utilizing excessive resources can increase the need for receiver storage on a vessel, cable length, battering charging stations, data retrieval off of receivers for the survey, or data processing.

Systems and methods of the present technical solution can facilitate the generation of images using fewer receivers or receivers spaced further apart. Systems and methods of the present technical solution can facilitate the generation of images of certain locations using hydrophones positioned or configured in an array. For example, by generating images from data collected by a hydrophone located above an acoustic source that collects data regarding both the acoustic shot and reflections from the acoustic shot, the present technical solution can generate images for locations between receivers, which allows for a greater receiver spacing in an array, which can result in fewer receivers being used in an array, while also providing an image for a location that may not otherwise be imaged. Thus, the present technical solution can both facilitate the generation of images of locations not previously imaged while reducing the number of receivers in an array by increasing the receiver spacing.

At least one aspect is directed to a system of seismic hazard detection with receiver spacing. The system can include a first string of one or more acoustic sources and a second string of one or more acoustic sources opposite the first string. The system can include a first one or more hydrophones mounted within a predetermined distance of the first string of one or more acoustic sources. The system can include a second one or more hydrophones mounted within the predetermined distance of the second string of one or more acoustic sources. The system can include the first one or more hydrophones to record an acoustic shot generated from a source on the first string of one or more acoustic sources. The system can include the second one or more hydrophones to record the acoustic shot and acoustic reflections corresponding to the acoustic shot. The system can include a data processing system comprising one or more processors and memory. The data processing system can receive seismic data corresponding to the acoustic shot and the acoustic reflections recorded by the second one or more hydrophones. The data processing system can generate an image from the acoustic shot and the acoustic reflections with the seismic data recorded by the second one or more hydrophones mounted within the predetermined distance from the second string of one or more acoustic sources.

At least one aspect is directed to a method of seismic hazard detection with receiver spacing. The method can include providing a first string of one or more acoustic sources and a second string of one or more acoustic sources opposite the first string. The method can include providing a first one or more hydrophones mounted within a predetermined distance of the first string of one or more acoustic sources. The method can include providing a second one or more hydrophones mounted within the predetermined distance of the second string of one or more acoustic sources. The method can include recording, by the first one or more hydrophones, an acoustic shot generated from a source on the first string of one or more acoustic sources. The method can include recording, by the second one or more hydrophones, the acoustic shot and acoustic reflections corresponding to the acoustic shot. The method can include receiving, by a data processing system comprising one or more processors and memory, seismic data corresponding to the acoustic shot and the acoustic reflections recorded by the second one or more hydrophones. The method can include generating, by the data processing system for display via a display device, an image from the acoustic shot and the acoustic reflections with the seismic data recorded by the second one or more hydrophones within the predetermined distance from the second string of acoustic sources.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIGS. 2A-2C depict arrays used in a system of seismic hazard detection with increased receiver spacing in accordance with an implementation.

Like reference numbers and designations in the various drawings indicate like elements.

DETAILED DESCRIPTION

Figure 1:
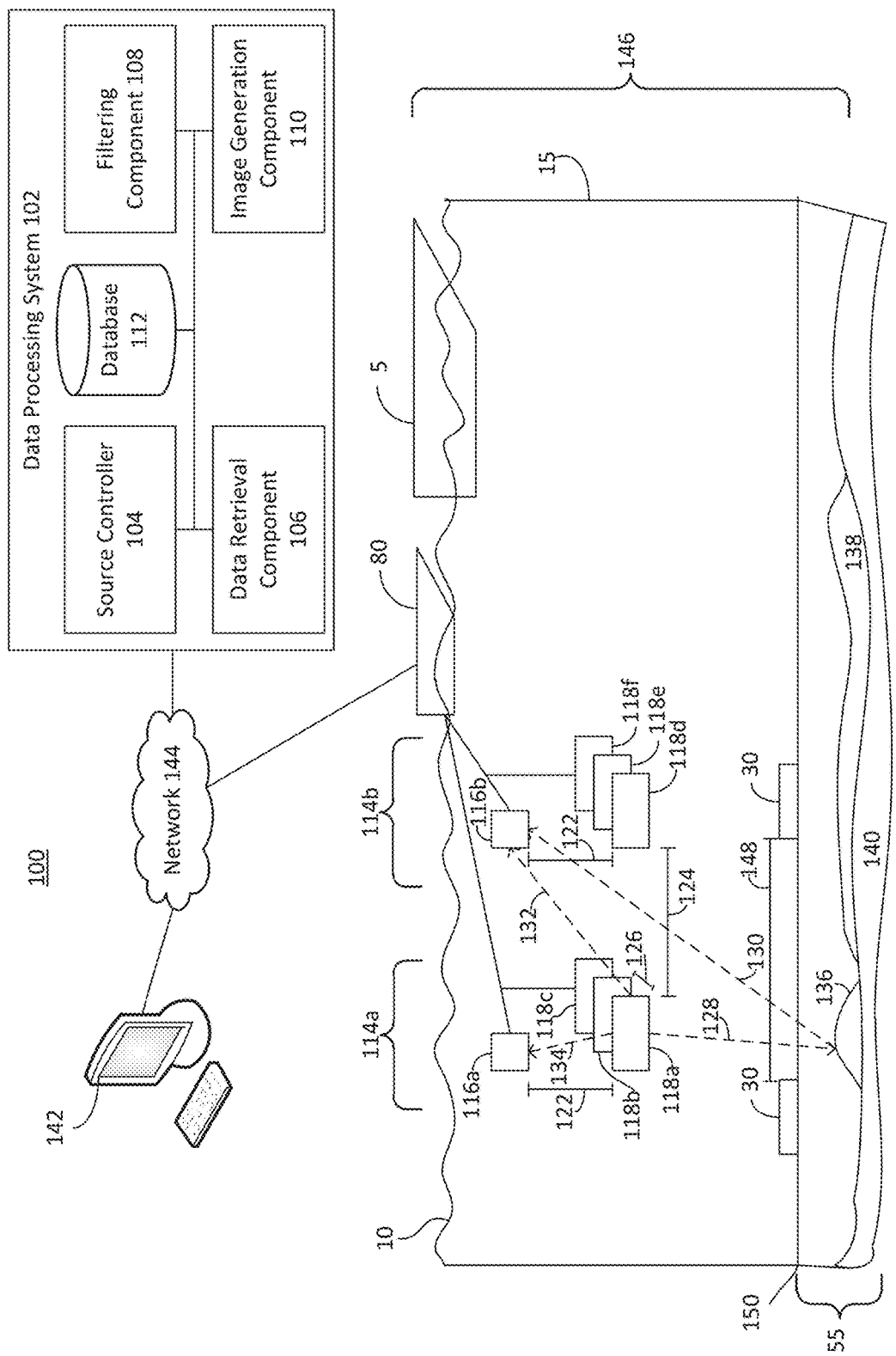
FIG. 1 depicts a system of seismic hazard detection with increased receiver spacing, in accordance with an implementation.

The present disclosure is directed to systems and methods of near surface imaging and hazard detection with increased receiver spacing. The systems and methods of the present disclosure can provide shallow images that can include or indicate shallow hazards. The systems and methods of the present disclosure can use a near field array. The systems and methods of the present disclosure can use one or more hydrophones located above, below, beside or otherwise situated in close proximity (e.g., within 1 meter, 2 meters, 3 meters, 4 meters or 5 meters) of an array of sources to collect data that can be used to characterize the source, as well as collect data that can be used to generate an image of the subsurface.

For example, an array of source guns can include one or more hydrophones located approximately 1 meter (e.g., plus or minus 50%) above, below or beside one or more source guns. The hydrophone can be used to characterize the source gun when the source gun fires, effectively recording a boom that can be analyzed to characterize the source. The hydrophone can also record higher quality data, and generate a recording of a longer duration (e.g., 400 milliseconds as compared to 2 to 10 seconds). Along with recording the acoustic shot, or boom, the hydrophone can also record reflection data. This reflection data can correspond to acoustic waves of the acoustic shot that travel through the aqueous medium and into the earth via the ocean bottom, and are then reflected by a subsurface lithologic formation or hydrocarbons back towards a receiver. The receiver can refer to or include a seismic data acquisition node, geophone, or hydrophone.

However, seismic surveys may not be able to capture sufficient data or generate images for certain locations without introducing additional receivers into the array. Having excessive receivers in an array can increase resource utilization, such as increase fuel usage if the receivers are being towed in a streamer configuration, or increase resources associated with deploying receivers on the ocean bottom. Further, utilizing excessive resources can increase the need for receiver storage on a vessel, cable length, battering charging stations, data retrieval off of receivers for the survey, or data processing.

Systems and methods of the present technical solution can facilitate the generation of images using fewer receivers. Systems and methods of the present technical solution can facilitate the generation of images of certain locations using hydrophones positioned or configured in an array. For example, by generating images from data collected by a hydrophone located above an acoustic source that collects data regarding both the acoustic shot and reflections from the acoustic shot, the present technical solution can generate images for locations between receivers, which allows for a greater receiver spacing in an array, which can result in fewer receivers being used in an array, while also providing an image for a location that may not otherwise be imaged.

Thus, the present technical solution can both facilitate the generation of images of locations not previously imaged while reducing the number of receivers in an array by increasing the receiver spacing.

Further, the systems and methods of the present technical solution allow for the collection of near field data used to produce images of the near field. Images of the near field can be used for near surface or sub-surface hazard detection. The present technical solution allows for near surface or sub-surface hazard detection without increasing the number of receivers in the array or reducing the spacing of receivers in the array. Rather, the systems and methods of the present technical solution can facilitate near surface or sub-surface hazard detection using fewer receiver nodes, which is faster, safer, and reduces resource consumption. To do so, the present technical solution can utilize the hydrophone located above the acoustic sources that collect data regarding the acoustic shot for the purpose of characterize the acoustic shot to also reflection data corresponding to the acoustic shot. The present technical solution can generate an image from the data collected by the hydrophone located above the acoustic source, where the data includes both the acoustic signals from the acoustic shot, as well as acoustic signals corresponding to reflections of the acoustic shot that are reflected via the seabed. In some case, the present technical solution can filter this collected data to remove or filter out the data corresponding to the acoustic shot, identify the reflections, and then generate an image of the reflections. The image of the reflections can indicate near surface or sub-surface hazards, such as gas pockets located within 100 meters, 200 meters, 300 meters, 400 meters, 500 meters, 700 meters, 800 meters, 1,000 meters or more below the ocean bottom. By identifying these hazards, a safer location for drilling can be selected that may avoid such hazards.

FIG. 1 illustrates a system to perform a seismic imaging in accordance with an implementation. The system 100 can include a data processing system 102. The data processing system 102 can include one or more processors, memory, logic arrays, or other components or functionality depicted in FIG. 6. The data processing system 102 can include or execute on one or more servers. The data processing system 102 can include one or more servers in a server farm, or distributed computing infrastructure, such as one or more servers forming a cloud computing infrastructure. The data processing system 102 can include at least one logic device such as a computing device 600 having one or more processors 610*a-n*. The data processing system 102 can be located on a vessel 80. A component of the data processing system 102 can be located on the vessel 80, and a second component of the data processing system 102 can be located remotely.

The data processing system 102 can include, interface or otherwise communicate with at least one interface. The data processing system 102 can include, interface or otherwise communicate with at least one database 112. The data processing system 102 can include, interface or otherwise communicate with at least one source controller 104. The data processing system 102 can include, interface with or otherwise communicate with data retrieval component 106. The data processing system 102 can include, interface with or otherwise communicate with at least one image generation component 110. The data processing system 102 can include, interface with or otherwise communicate with at least one filtering component 108.

The source controller 104, data retrieval component 106, image generation component 110, or filtering component 108 can each include at least one processing unit or other logic device such as programmable logic array engine, or module configured to communicate with the database repository or database 112. The source controller 104, data retrieval component 106, image generation component 110, or filtering component 108 can be separate components, a single component, or part of the data processing system 102. The system 100 and its components, such as data processing system 102, can include hardware elements, such as one or more processors, logic devices, or circuits.

The data processing system 102 can communicate with one or more computing devices 142, the vessel 80, or component of the seismic survey via network 144. The network 144 can include computer networks such as the Internet, local, wide, metro, or other area networks, intranets, satellite networks, and other communication networks such as voice or data mobile telephone networks. The network 144 can be used to access information resources such as seismic data, parameters, functions, thresholds, or other data that can be used to identify or detect hazards in the near field and display images corresponding to the seismic survey or hazards via one or more computing devices 142, such as a laptop, desktop, tablet, digital assistant device, smart phone, or portable computers. For example, via the network 144 a user of the computing device 142 can access information or data provided by the data processing system 102. The computing device 142 can be located proximate to the data processing system 102, or be located remote from the data processing system 102. For example, the data processing system 102 or computing device 142 can be located on a vessel 80 or a vessel 5.

The data processing system 102 can interact with or retrieve data from a seismic survey. The system 100 can include components in a marine seismic survey environment 146. The seismic survey can be a marine based seismic survey, such as a deep sea or ocean bottom survey. For example, a vessel 80 can be on a surface of water 10. The vessel 80 can tow or deploy components used to perform the seismic survey. The components can include one or more hydrophones 116*a-b*, one or more shot sources 118*a-f*, and one or more sensor devices 30.

In the marine seismic environment 146, the vessel 80 can deploy or two one or more strings of sources 114*a-b*. For example, the vessel 80 can deploy or two a first string 114*a* and a second string 114*b*. The first string 114*a* can refer to or include one or more sources 118*a*, 118*b* and 118*c*. The first string 114*a* can also include a hydrophone 116*a*. The second string 114*b* can include one or more shot sources 118*d*, 118*e*, and 118*f.* The second string 114*b* can include a hydrophone 116*b*. The second string 114*b* can be located opposite the first string 114*a*. For example, the first string 114*a* can run parallel to the second string 114*b*. The first string 114*a* can be separated from the second string 114*b* by a distance 124, such as 50 meters, 55 meters, 60 meters, 65 meters, 70 meters, 75 meters, 90 meters or some other distance that facilitates performing a seismic survey in a marine environment.

There can be one or more strings of air guns (e.g., 2 strings, 3 strings, 4 strings or more). Each string can include more than one air gun or source located on the string (e.g., 2, 3, 4 5, 6, 7, 8 or more). This collection of air guns on a single string can be referred to as an "array" of guns. The vessel can tow and use, for example, 2, 3, 4, 5, 6, 7 or more strings (depending on towing ability and width of the vessel 80). When a source is fired, one or more strings of guns can be fired. All air guns on a string can fired, or individual air guns on a single string can be fired in close temporal proximity and in a pre-determined pattern. A shot can refer to a gun or string of guns being fired. The acoustic shot can be from one gun or more than one gun, on one or more strings. A source array can be a collection (1 or more guns) that are fired in close temporal proximity (e.g., within 1 second or 2 seconds, or simultaneously) to each other. The source guns can be single guns or a gun cluster. A gun cluster can be a grouping of two or more guns very close to each other, typically 1 meter. A gun cluster may have a single near field hydrophone. In an illustrative example, the vessel 80 can tow 3 strings of guns, where each string includes 6 air guns. A near field hydrophone can be mounted near each of the guns. Thus, the vessel 80 can two 18 near field hydrophones.

The data processing system 102 can include a source controller 104 designed, constructed or operational to facilitate generating a shot from an acoustic source. The source controller 104 can coordinate firing of shots by the acoustic source. The source controller 104 can maintain timestamps corresponding to shots fired by acoustic sources 118*a-f*. The source controller 104 can control which acoustic source is fired, generate a pattern for firing acoustic sources, use a flip flop pattern, a dither pattern for multiple shots, or use other timing function.

The acoustic sources 118*a-f* can be separated from one another in the array. The array can refer to the array formed from two or more strings 116*a-b*. For example, the array can be defined by the strings 116*a* and 116*b*. The distance between acoustic sources 118*a* and 118*b* in the first string 114*a* can be distance 126, such as such as 50 meters, 55 meters, 60 meters, 65 meters, 70 meters, 75 meters, 90 meters or some other distance that facilitates performing a seismic survey in a marine environment. The acoustic sources in the second string 114*b* can also be separated by distance 126.

The hydrophone 116*a* can be located above the shot sources 118*a-c*. In some cases, the first string 114*a* can include one or more hydrophones 116*a*. For example, each shot source 118*a-c* can have a corresponding hydrophone 116*a* located above the shot sources 118*a-c*. The hydrophone 116*a* can be located directly above a shot source 118*a* (e.g., along a vertical axis that is perpendicular to the water surface 10 and that passes through the hydrophone 116*a* and shot source 118*a*). The hydrophone 116*a* can be located above a shot source 118*a* but not directly above, such as off to a side. The hydrophone 116*a* can be located within a distance 122 above the shot source 118*a*, or a distance in a vertical z-axis. The distance 122 can be within 1 meter, 1.5 meters, 2 meters, or more. The hydrophone 116*a* can be located approximately within 1 meter above the shot source 118*a* (e.g., plus or minor 10% or 15% or 20%). The hydrophone 116*a* can be located approximately within 2 meters above the shot source 118*a* (e.g., plus or minor 10% or 15% or 20%).

The hydrophones 116*a-b* can be configured to detect or collect signals, information or data corresponding to shots fired, triggered or otherwise provided by the source 118*a*. The hydrophone can acquire trace data responsive to acoustic signals propagated from the acoustic source. Thus, a seismic survey may be performed by providing a source signal, such as an acoustic or vibrational signal. Reflected signals from the seabed 55 and underlying structures (e.g., 136, 138, or 140) are recorded by one or more sensor devices 30 or hydrophones 116*a-b* on. The source signal or "shot" can be provided by a second marine vessel 80, such as a gun boat. In some cases, the source signal can be provided by the first marine vessel 5. The data processing system 102 can use the recorded data to generate an image, graph, plotted data, or perform other analysis.

Hydrophones 116a-b can be configured to measure a pressure wavefield that is transferred from a liquid to a solid, such as from an aqueous medium into the hydrophone pressure sensor. As compared to the solid-to-solid interface associated with the geophone, the pressure wavefield can undergo less attenuation or change at the liquid to solid interface where this motion due to the pressure wavefield is transferred into the hydrophone. Further, liquid sea water can be relatively consistent across the area of a survey as compared to the geology of the seabed, so there may be minimal differences in hydrophone attenuation across a survey. The hydrophone 116a-b can acquire hydrophone trace data responsive to the acoustic signal propagated by the acoustic source 118a-f. The hydrophone 116a-b can include one or more components of the sensor device 30, such as a power source, battery, memory, processor, controller, ports, etc.

The acoustic source 118a can fire or generate acoustic signals (e.g., acoustic signals 128, 134, 132, or 130). The acoustic signal 134 can propagate through the aqueous medium towards hydrophone 116a, and be recorded by hydrophone 116a. The acoustic signal 132 can propagate through the aqueous medium towards hydrophone 116b, and be recorded by hydrophone 116b. The acoustic signal 128 can propagate through the aqueous medium towards the seabed 55, traverse the seabed and reflect off of a subsurface formation 136, and reflect back via acoustic signal 130 towards hydrophone 116b, and be collected or recorded by hydrophone 116b.

For example, the acoustic source 118a can generate an acoustic shot, and the first hydrophone 116a can record an acoustic signal from the acoustic shot. Recording an acoustic shot by a first hydrophone 116a can refer to or include recording an acoustic signal 134 from the acoustic shot generated by the acoustic source 118a. Recording the acoustic shot by a second hydrophone 116b can refer to or include recording an acoustic signal 132 from the same acoustic shot generated by the acoustic source 118a. The second hydrophone 116b can also record acoustic reflections corresponding to the acoustic shot. Recording acoustic reflections can refer to or include recording acoustic signal 130 that is a reflection from a subsea 55 formation, such as 136, where the reflection corresponds to an acoustic signal 128 corresponding to the same acoustic shot generated by the acoustic source 118a that generated acoustic signals 134 and 132.

In some cases, the hydrophone 116a may also record the acoustic reflections. The hydrophone 116b can record both the acoustic signal 132 from the acoustic shot, as well as acoustic reflections 130. The hydrophone 116b can have a dynamic range or sensitivity or resolution sufficient to record both the acoustic shot acoustic signal 132, and the reflection acoustic signal 130. The hydrophone 116a-b can generate a recording having a duration of 2 to 10 seconds, or more. The duration of the recording can allow for the recordation of acoustic signals corresponding to the original acoustic shot (e.g., acoustic signal 132) as well as reflection acoustic signals 130. In some cases, there may be numerous acoustic reflection signals recorded by the hydrophone 116b, such as reflections off of subsea formations 136, 140 or 138, as well as multiple reflection acoustic signals that may reflect off of the water surface 10 and be detected by the hydrophone 116b from the water surface 10.

The data processing system 102 can include an data retrieval component 106 (or interface component) designed, configured, constructed, or operational to receive seismic data obtained via acoustic signals generated by at least one acoustic source and reflected from at least one subsurface lithologic formation. The data retrieval component 106 can receive seismic data corresponding to the acoustic shot and the acoustic reflections recorded by the second hydrophone. For example, a source device 118a-f (such as an acoustic source device 85 depicted in FIG. 5) can generate an acoustic wave or signal that reflects from at least one subsurface lithologic formation beneath the seabed 55, and is sensed or detected by seismic sensor devices 30. The data retrieval component 106 can receive the seismic data via a wired or wireless communication, such as a direct wired link or through a wireless network or low energy wireless protocol. The data retrieval component 106 can include a hardware interface, software interface, wired interface, or wireless interface. The data retrieval component 106 can facilitate translating or formatting data from one format to another format. For example, the data retrieval component 106 can include an application programming interface that includes definitions for communicating between various components, such as software components. The data retrieval component 106 can communicate with one or more components of the data processing system 102, network 144, or computing device 142.

The data processing system 102 can receive the seismic data as ensembles of common-source or common-receiver data. The seismic data can include ensembles or sets of common-source or common-receive data.

By receiving data from the hydrophone 116b that includes both the acoustic shot information (e.g., acoustic signal 132) and acoustic reflection information (e.g., acoustic signal 130), the system 100 allows for more efficient performance of the seismic survey since the same hydrophone 116b can be used to both characterize the acoustic shots, as well as generate images of the subsea 55 features. The hydrophone 116b can generate images of locations of the subsea 55 without a sensor device 30 located at that location or configured to generate an image for that location, thereby allowing for a greater spacing between seismic sensor devices 30. For example, the spacing 148 between seismic sensor devices 30 can be greater than a spacing that may be used to generate a satisfactory image of a location at the nearfield subsea 55, such as location 136, but the present technical solution allows for image generation at a location corresponding to the formation 136, thereby providing a technical improvement since sensor devices 30 can be spaced apart by a distance 148 and still allowing for the overall system 100 to generate an image of a location corresponding to formation 136, which may not otherwise have been possible at a spacing of 148 without a hydrophone 116b configured to collect acoustic signals 130 and a filtering component 108 to remove the acoustic shot signal 132.

The data processing system 102 can include a filtering component 108 designed, constructed and operational to filter the seismic data to remove the acoustic shot from the seismic data. The data processing system 102 can filter the seismic data to remove the acoustic shot because the image generation component 110 may not be able or configured to generate a suitable image that includes the acoustic signals corresponding to the acoustic shot. For example, the filtering component 108 can remove acoustic signals 132 from the seismic data, while keeping the acoustic signals 130 that correspond to reflections from the subsea 55 features. The acoustic signals 132 from the acoustic shot can generate excessive noise or artifacts in any image. The acoustic signals 132 from the acoustic shot may have a high amplitude relative to the acoustic reflections 130, thereby potentially masking or hiding the acoustic signals 130 in the image. Thus, the filtering component 108 can remove the acoustic signals 132 corresponding to the acoustic shot in order to facilitate generation of an improved image by the image generation component 110 that identifies or indicates subsea features 136 such as the formation 136 to allow for nearfield hazard detection.

The filtering component 108 can use one or more techniques, rules, policies or functions to filter out the acoustic shot acoustic signal 132 prior to forwarding the seismic data to the image generation component 110. The filtering component 108 can use timestamps to remove the acoustic shot acoustic signal 132. The filtering component 108 can obtain timestamps for the acoustic shots from the source controller 104. The filtering component 108 can obtain timestamps from or via the source controller 104 for when shots were fired, and then determine which set of samples to remove from the seismic data. For example, the filter component 108 can remove all samples before a timestamp, or within a range of timestamps.

The filtering component 108 can filter out data based on an amplitude threshold. The filtering component 108 can use a predetermined amplitude threshold or a dynamic amplitude threshold. The filtering component 108 can remove samples having an amplitude greater than what a highest expected amplitude might be from a reflection acoustic signal 132. The filtering component 108 can remove samples having an amplitude greater than what a highest expected amplitude might be from a reflection acoustic signal 132, plus an amplitude offset. The filtering component 108 can use a dynamic amplitude threshold to remove samples that are within a certain percentage or number of dB from a highest amplitude.

The filtering component 108 can remove samples based on a frequency filter, such as a low pass filter, bandpass filter or high pass filter. The filtering component 108 can set the frequency ranges or thresholds based on frequencies expected to correspond to acoustic signal shots 134 as compared to acoustic reflection 130.

The data processing system 102 can include an image generation component 110 designed, constructed or operational to generate an image. The image generation component 110 can generate the image from seismic data that includes both the acoustic reflections 130, and the acoustic signal 132 from the acoustic shot. For example, the image generation component 110 can receive the seismic data from the data retrieval component 106 that includes the seismic data collected by a hydrophone located above a source that was in standby and opposite a source that fired, and then generate an image that includes the acoustic shot (e.g., signal 132) as well as the reflections (e.g., 130).

In some cases, the image generation component 110 can generate the image from seismic data that includes the acoustic reflections 130, but not the acoustic signal 132 from the acoustic shot. In some cases, the image generation component 110 can process the seismic data to generate the image, such as forward propagate or backward propagate the traces, applying binning function, transforms, or otherwise manipulate or process the data to generate an image. In some cases, the data processing system 102 can propagate the seismic data through the subsurface model to generate the image.

The data processing system 102 can generate, based on the acoustic reflections absent the acoustic shot, an image of a portion of earth between receiver stations. For example, the portion of the earth 136 can be between sensor devices 30. The data processing system can generate an image of the portion of earth 136 between receiver stations 30 where the portion of the earth is within 100 meters of an ocean bottom. For example, the subsea portion 55 can be less than 100 meters from the water/surface boundary 150 that corresponds to the ocean bottom. The data processing system can identify, or provide an image that indicates or from which can be identified, a gas-pocket, such as gas-pocket 136.

Figure 4:
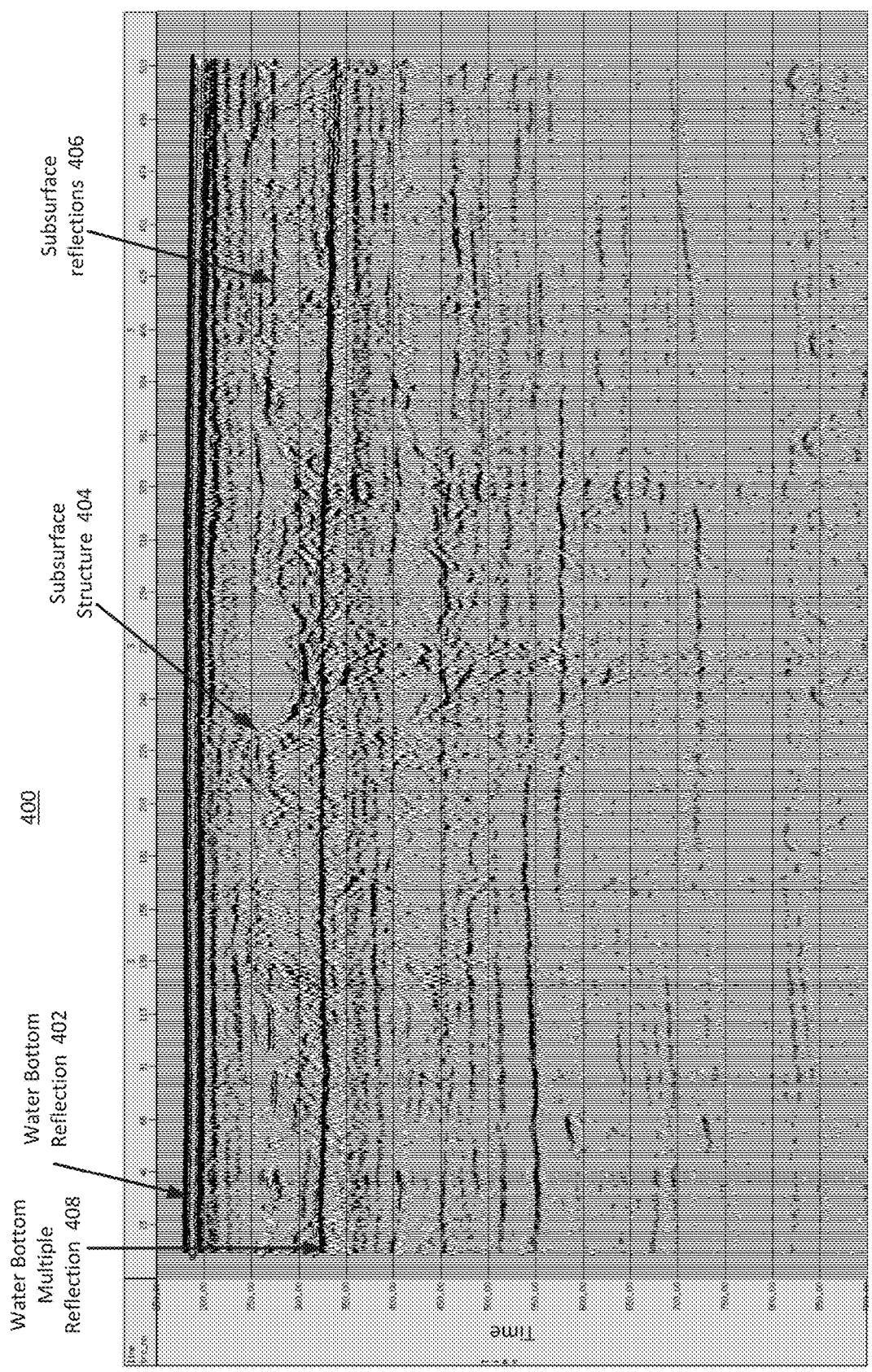
FIG. 4 is a diagram illustrating imaging by a system depicted in FIG. 1, the arrays used in FIGS. 2A-2C, or the method depicted in FIG. 3, in accordance with an implementation.

For example, FIG. 4 shows an illustration 400 of an image generated using one or more components of system 100 depicted in FIG. 1. The image illustrates the acoustic signal reflections. The image 400 includes trace data. Each trace is single stacked shot into a near field array. The trace spacing can be the shot interval, such as 25 meters, 50 meters, 12.5 meters. for example, the trace spacing in the display 400 can be 12.5 meters.

At 402, the display shows water bottom reflections. At 404, the display shows subsurface structures. The subsurface structures at 404 can be near the ocean bottom (e.g., within 100 meters, 200 meters, 300 meters, 400 meters, 500 meters, or 1000 meters). At 406, the display shows subsurface reflections. At 408, the display shows water bottom multiple reflections. Thus, using the techniques of the present technical solution, the system can generate near surface imaging and hazard detection. The receivers (e.g., geophones) may be spaced further apart without detracting from collecting the data used to generate this image because the data used can be recorded by the near field hydrophone array instead of the geophone or ocean bottom nodes or other streamers. Thus, by using the near field hydrophones that are mounted proximate to the gun sources, the data processing system can generate a display indicating the near surface features, which can include hazards such as a gas pocket or other subsurface features.

Figure 2A:
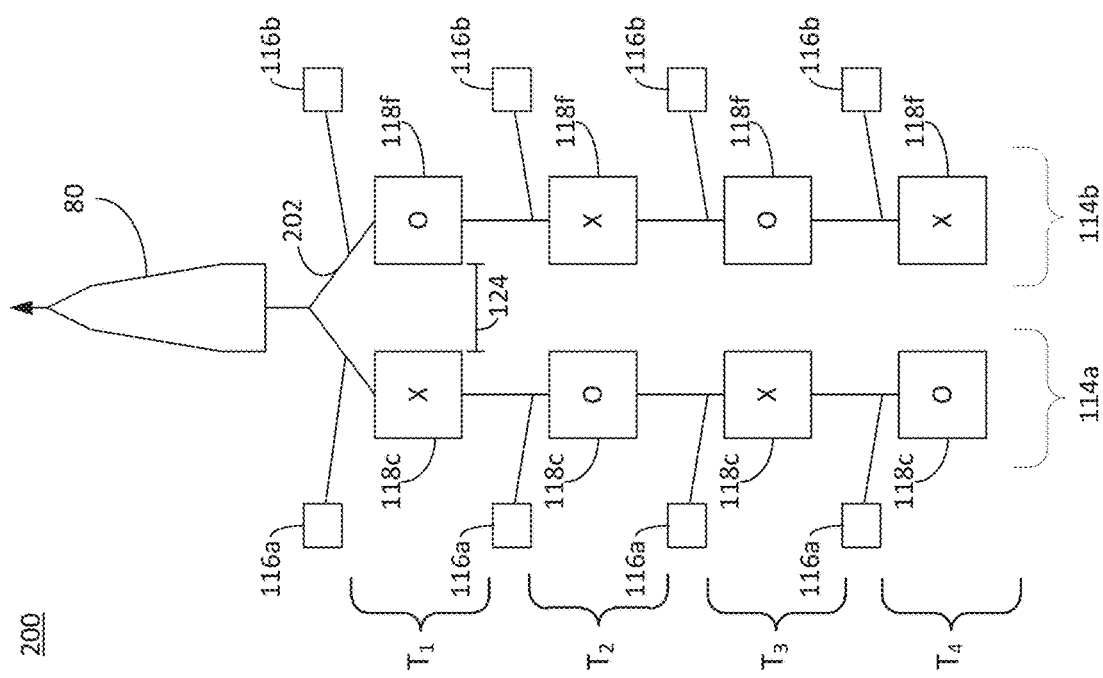

FIG. 2A depicts an array used in a system of seismic hazard detection with increased receiver spacing in accordance with an implementation. The system 200 can depict two acoustic sources (e.g., 118c and 118f) that alternate firing as the vessel 80 travels through water in a direction over time. The label "X" can refer to the active source at that moment in time, and the label "O" can refer to the passive source at that moment in time. FIG. 2 depicts the progression of the two sources 118c and 118f over time windows T1, T2, T3, and T4 of a seismic survey. The seismic survey can include greater time windows or fewer time windows. The time window can have a duration, such as 2 seconds, 4 seconds, 5 seconds, 10 seconds, 30 seconds, 60 seconds, 2 minutes, 3 minutes or more. In the first time window T1, acoustic source 118c can be the active source, and acoustic source 118f can be the passive source. As the vessel travels through the water, the shot sequence can progress to time window T2, where the acoustic source 118c can be switch to be the passive source, and the acoustic source 118f can switch to be the active source. As the vessel travels through the water, the shot sequence can progress to time window T3, where the acoustic source 118c can be alternate back to be the active source, and the acoustic source 118f can alternate back to be the passive source. As the vessel travels through the water, the shot sequence can progress to time window T4, where the acoustic source 118c can be switch to be the passive source, and the acoustic source 118f can switch to be the active source.

The system 200 can trigger the shots using a flip flop dual source mode. For example, the source controller 104 can instruct the acoustic sources 118c and 118f to fire using a flip flop dual source mode. The indication of "X" on the acoustic source 118c can indicate an active source. And the indication "O" on the acoustic source 118f can indicate the inactive or other source. Active sources can fire shots, while inactive sources may not fire shots. In the flip flop dual source mode configuration, a source 118c on a first string can fire, while the corresponding source 118f on the opposite string can be in standby, passive mode, or not fire. Thus, the source controller 104 can cause the first string of acoustic sources can be configured to trigger a shot on alternating acoustic sources of the first string of acoustic sources, and the second string of acoustic sources configured to trigger a shot on alternating acoustic sources of the second string that are opposite acoustic sources on the first string of acoustic sources that are in standby.

The hydrophone located above the source that is not firing (e.g., source 118f) can collect data that can be used to generate images of the earth. The hydrophone located above the other source (or the source that is not firing) can be hydrophone 116b. The hydrophone located above the source that fires a shot (e.g., source 118c) can be a hydrophone 116a. The hydrophone 116a may collect data regarding the acoustic shot. The hydrophone 116a can collect data about the acoustic source that can be used to identify a characteristic of the source from the acoustic shot recorded by the first hydrophone 116a. The second hydrophone 116b can collect data about the acoustic shot that can also be used to identify a characteristic of the source from the acoustic shot recorded by the second hydrophone 116b. Thus, the second hydrophone 116b can collect seismic data that is both indicative of the acoustic shot as well as subsea features. Characteristics of the acoustic shot can include timing, pattern, number of acoustic shots, amplitude of acoustic shot, frequency, or pressure. Both hydrophones 116a and 116b can record data on every shot, regardless of whether the corresponding source is active or passive.

FIG. 2B depicts an array used in a system of seismic hazard detection with increased receiver spacing in accordance with an implementation. The system 201 can depict multiple acoustic sources on each string of acoustic sources, where the strings alternate firing as the vessel 80 travels through water in a direction over time. For example, the first string 114a can include 4 acoustic sources 118c, 118b, 118a, and 118g. The second string 114b can include 4 acoustic sources 118f, 118e, 118d, 118h. A near field hydrophone can be mounted proximate to each source on each string. For example, hydrophone 116a can be mound within a predetermined distance (e.g., within 1 meter, within 2 meters, within 5 meters) from acoustic source 118c; hydrophone 116c can be mound within a predetermined distance from acoustic source 118b; hydrophone 116d can be mound within a predetermined distance from acoustic source 118a; and hydrophone 116e can be mound within a predetermined distance from acoustic source 118g. The second string 114b can also include multiple sources and multiple hydrophones. For example, hydrophone 116b can be mounted near source 118f; hydrophone 116f can be mounted near source 118e; hydrophone 116g can be mounted near source 118d; and hydrophone 116h can be mounted near source 118h.

If there are multiple sources on each string of sources, then all the sources on the string can be active, while all the sources on the opposite string can be passive. For example, each source 118c, 118b, 118a and 118g on the first string 114a can fire or be active during a first time window; and each source 118f, 118e, 118d, and 118h on the second string 114b can be passive or in standby during the first time window. In a second time window, all the active sources on the string 114a can flip to being passive sources, and all the passive sources on the string 114b can flip to being active sources.

If there are multiple sources on a string, then the data processing system can generate multiple image lines for each source fired. As the vessel travels through water over time, the seismic survey shot sequence can progress and the sources on the first string can alternate from being active to being passive, while the sources on the second string can alternate from being passive to being active. The sources on a string of sources can be separated from one another by at least 50 meters. Any acoustic source on the first string of acoustic sources can be separated from any acoustic source on a second string of sources by at least a distance 124, such as 50 meters. Also, if there are multiple sources on a string, there can be multiple hydrophones associated with the string. Each source can have a corresponding hydrophone positioned or located proximate to the source (e.g., within 1 meter, 2 meters, 3 meters, 4 meters or 5 meters). Each source can have multiple (e.g., 2, 3, 4 or more) hydrophones positioned or located proximate to the source. The one or more hydrophones can be positioned underwater above, below, or on a side of the source.

The acoustic sources in the first string of acoustic sources can be separated by at least 25 meters from one another, 30 meters, 50 meters, 60 meters or more. The acoustic sources in the second string of acoustic sources can be separated by at least 25 meters from one another, 30 meters, 50 meters, 60 meters or more. The first string of acoustic sources can separated from the second string of acoustic sources by at least 35 meters, 40 meters, 50 meters or more.

As an example, the system 200 depicted in FIG. 2A can include 1 source gun 118c on a string. When source gun 118c fires a shot, the near field hydrophone ("NFH") 116a near gun 118c can measure and record both i) a direct arrival—from the gun 118c to the NFH 116a; and ii) a reflected arrival—from the gun 118c to the reflector below (e.g., the ocean bottom) and back to the NFH 116a. The reflected arrival can be used to create an image line, so this example would create one image lines.

Further, the system 200 can include two guns 118c and 118f on different strings 114a and 114b, and each gun 118c and 118f can have a NFH (e.g., 116a and 116f) mounted proximate to the gun. In a first time window T1 when gun 118c fires a shot, the NFH 116a can measure and record both a direct and a reflected arrival; the NFH 116b can measure and record both i) a direct arrival—from the gun 118c to NFH 118f and, ii) a reflected arrival—from the gun 118c to the reflected mid-point between the gun and the NFH 116b.

In a second time window T2 when 118f fires a shot, NFH 116b can measure and record both a direct and a reflected arrival; and NFH 116a can measure and record both a direct arrival—from the gun 118f to NFH 116a and a reflected arrival—from the gun 118f to the reflected mid-point between the gun 118f and the NFH 116a. Each of these measures of reflected arrivals can be used to create an image line, so this example can create three image lines (118c to 116a, midpoint between 118c and 116b (and 116a and 118f if the midpoints are different), and 118f to 116b).

Figure 2C:
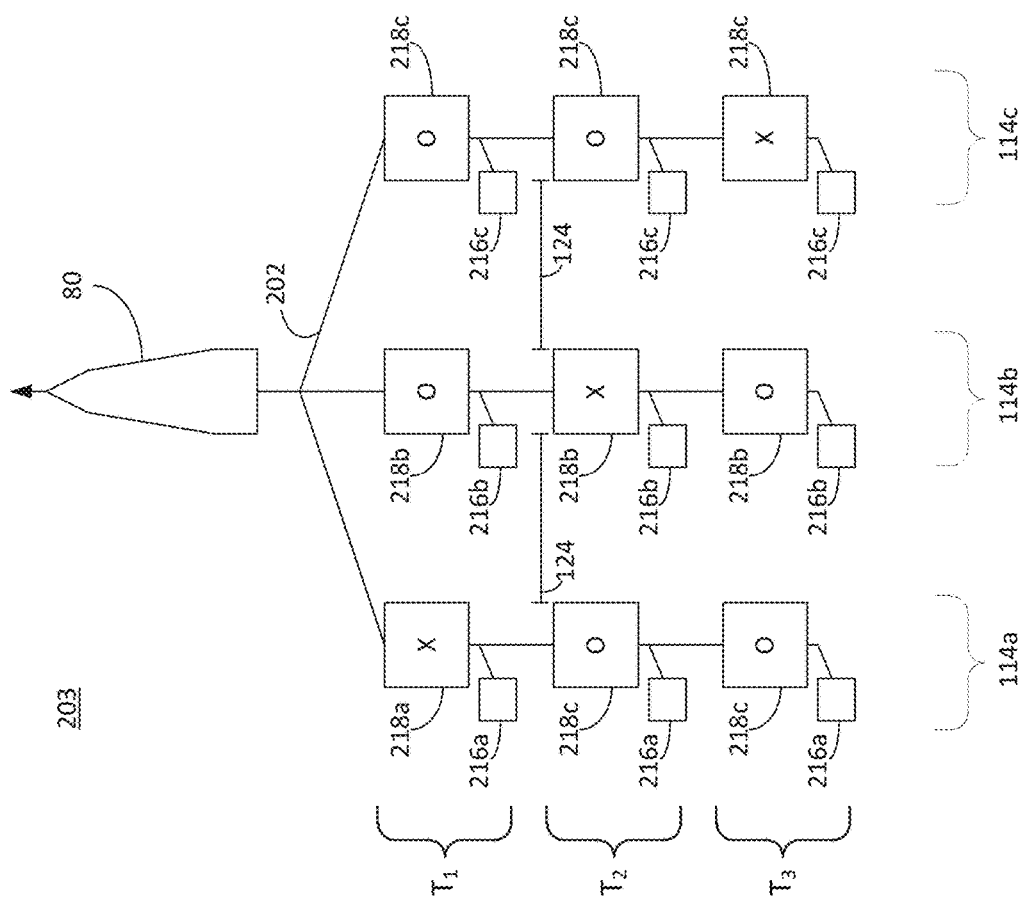

The example system 203 depicted in FIG. 2C includes three strings 114a, 114b and 114c towed by vessel 80. Each string can include a source gun 218 (e.g., source gun 118a). Each string can include a near field hydrophone 216 (e.g., 116a) near the source gun or within a predetermine distance from the source gun (e.g., within 1 meter or 5 meters).

For example, there can be a first source gun 218a on a first string 114a; a second source gun 218b on a second string 114b; and a third source gun 218c on a third string 114c. Each source gun can have a corresponding NFH. For example, NFH 216a corresponds to gun 218a on the first string 114a, NFH 216b corresponds to gun 218b on the second string 114b, and NFH 216c corresponds to gun 218c on the third string 114c.

In time window T1, when source gun 218a fires a shot, then:

NFH 216a can measure and record both a direct and a reflected arrival,

NFH 216b can measure and record both a direct arrival—from the gun 218a to NFH 216b, and reflected arrival—from the gun 218a to the reflected mid-point between the gun 218a and the NFH 216b, and NFH 216c can measure and record both a direct arrival—from the gun 218a to NFH 216c, and reflected arrival—from the gun 218a to the reflected mid-point between the gun 218a and the NFH 216c.

In time window T2, when source gun 218b fires a shot, then:

NFH 216b can measure and record both a direct and a reflected arrival,

NFH 216a can measure and record both a direct arrival—from the gun 218b to NFH 216a, and reflected arrival—from the gun B to the reflected mid-point between the gun 218b and the NFH 216, and NFH 216c can measure and record both a direct arrival—from the gun 218b to NFH 216c, and reflected arrival—from the gun 218b to the reflected mid-point between the gun 218b and the NFH 216c.

In time window T3, when source gun 218c fires a shot, then:

NFH 216c can measure and record both a direct and a reflected arrival,

NFH 216a measure and record both a direct arrival—from the gun 218c to NFH 216a, and reflected arrival—from the gun 218c to the reflected mid-point between the gun 218c and the NFH 216a, and NFH 216b can measure and record both a direct arrival—from the gun 218c to NFH 216b, and reflected arrival—from the gun 218c to the reflected mid-point between the gun 218c and the NFH 216b.

When 1 gun (e.g., 218a) fires into 3 receivers (e.g., 216a, 216b and 216c), the data processing system can create 3 reflected images (e.g., a to a, a to b, a to c). When the next gun, which is evenly spaced, is fired then the data processing system can create 3 reflected images from each shot (e.g., 3×3=9), but even spacing can create multiple measures at the same line spacing, so there is not a unique image line for each reflected image. There are 5 unique "reflection locations" for these 9 shots because some locations are measured more than once by different shots, such as the mid-point a to b is the same as for b to a; the mid-point for b to c is the same as for c to b; the mid-point for a to c is the same as for c to a and this is the same as the reflection point for b to b. The data processing system can then produce the following image lines: directly underneath each source/NFH, and at the mid-point between each source/NFH.

Each of these reflected measures can be used to create an image line, so this example can create 5 different image lines. If the sources 218 are evenly spaced, the number of image lines created can be determined using the following equation: 2n−1, where n=the number of sources. For example, if there are 3 sources, then the number of image lines created from this technique=2×3−1=5.

If, however, there are 3 strings and they are NOT evenly spaced apart from one another, then the number of image lines the data processing system can create is greater. Because the un-even spacing eliminates the multiple measures at the same line spacing location, un-even spacing produces more image lines than even spacing. The number of image lines created by un-even spacing of the source/NFH is equal to the sum of the number of sources. For example, with 3 sources, the number of image lines=1+2+3=6 image lines. If there were 6 sources, for example, then the data processing system can create 21 image lines.

Thus, by removing the direct arrival data (and the bubble cause by the shot), the data processing system can process the reflection data to produce sub-surface images. This technique can be used with ocean bottom nodes or streamers. The systems and methods of the present technical solution can provide streamer configurations the ability to generate zero offset traces (and/or near-zero offset traces) from the A to A/B to B/C to C traces.

Thus, the present technical solution and technical improvement can provide more imaging data at no additional field cost or field time because the data processing system can remove the direct arrival data and process the reflected data recorded and stored in the near field hydrophone data. The data processing system, by separating this data from the bubble/direct arrival, can generate images from the data. In effect, you are extracting the data that has always been there to derive more reflection data for sub-surface imaging.

Figure 3:
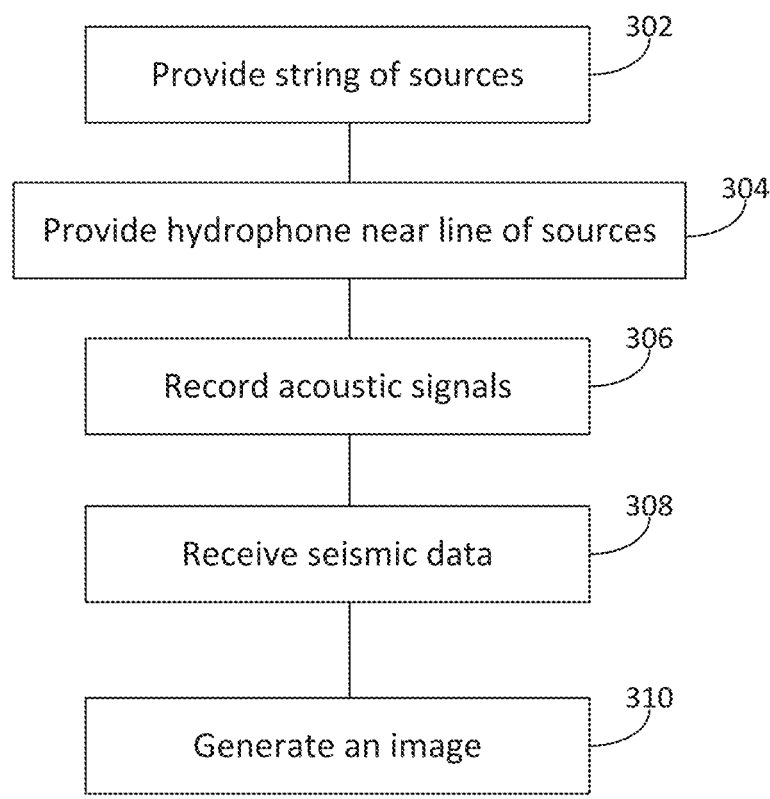
FIG. 3 depicts a method of seismic hazard detection with increased receiver spacing, in accordance with an implementation.

FIG. 3 is a method of seismic hazard detection with increased receiver spacing. The method 300 can be performed by one or more system or component depicted in FIG. 1 or FIG. 2, 5 or 6. For example, a data processing system, source controller 104, data retrieval component 106, filtering component 108 or image generation component 110 can perform one or more function or process of method 300. At ACT 302, the method 300 includes providing a string of sources. The method 300 can include providing a first string of acoustic sources and a second string of acoustic sources. The strings of acoustic sources can be towed by a marine vessel. The strings of acoustic sources can be located under water. The acoustic sources can be located mid-water. Each string of acoustic sources can include one or more acoustic sources, such as 1, 2, 3, 4 or more acoustic sources. The method 300 can include providing one or more strings of acoustic sources.

At ACT 304, the method 300 includes providing a hydrophone underwater and above a string of acoustic sources. A first hydrophone can be located above a first string of acoustic sources, and a second hydrophone can be located above a second string of acoustic sources. The hydrophone can be towed by the vessel. The hydrophone can be located 1 meter above the acoustic source. The hydrophone can be underwater. The hydrophone can be in mid-water. A hydrophone can be provided and located approximately 1 meter (e.g., plus or minus 20%) above each acoustic source in the string.

At ACT 306, the method 300 includes recording acoustic signals. The first hydrophone can record an acoustic shot generated from a source on the first string of acoustic sources. A second hydrophone can record the acoustic shot and acoustic reflections corresponding to the acoustic shot. The first hydrophone may also record the reflections.

At ACT 308, the method 300 includes receiving seismic data. A data processing system can receive seismic data corresponding to the acoustic shot and the acoustic reflections recorded by the second hydrophone. At ACT 310, the method 300 includes generating an image. The method can include generating the image from the acoustic reflections and the acoustic shot. The data processing system can generate the image for display via a display device.

Figure 5:
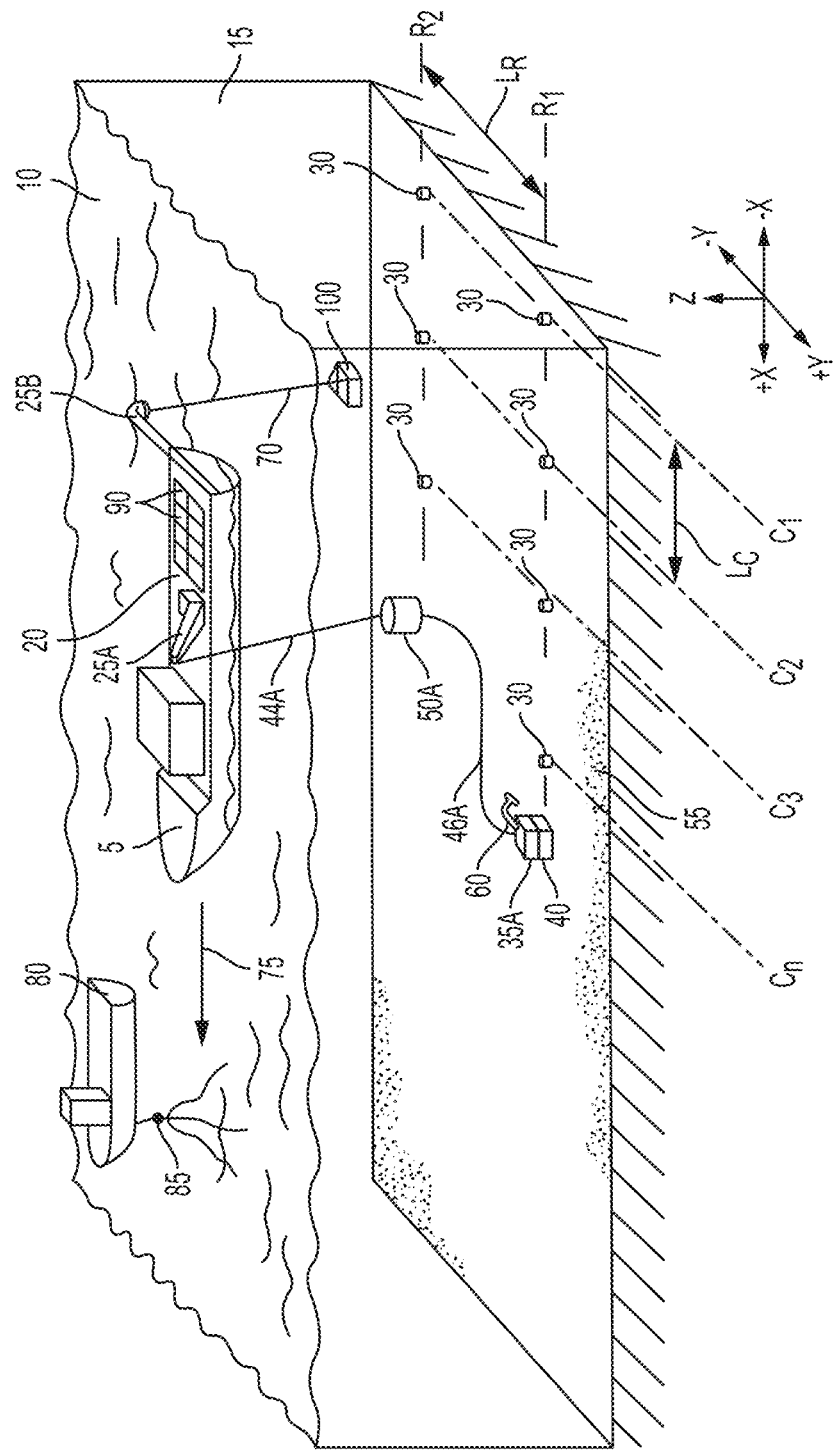
FIG. 5 depicts an isometric schematic view of an example of a seismic operation in deep water, in accordance with an implementations.

FIG. 5 is an isometric schematic view of an example of a seismic operation in deep water facilitated by a first marine vessel 5. FIG. 5 is a non-limiting illustrative example of a marine environment in which the systems and methods of the present disclosure can perform a seismic survey to collect seismic data and generate images.

By way of example, FIG. 5 illustrates a first vessel 5 positioned on a surface 10 of a water column 15 and includes a deck 20 which supports operational equipment. At least a portion of the deck 20 includes space for a plurality of sensor device racks 90 where seismic sensor devices (e.g., first device 102) are stored. The sensor device racks 90 may also include data retrieval devices or sensor recharging devices.

The deck 20 also includes one or more cranes 25A, 25B attached thereto to facilitate transfer of at least a portion of the operational equipment, such as an ROV (e.g., second device 104) or seismic sensor devices, from the deck 20 to the water column 15. For example, a crane 25A coupled to the deck 20 is configured to lower and raise an ROV 35A, which transfers and positions one or more sensor devices 30 on a seabed 55. The seabed 55 can include a lakebed 55, ocean floor 55, or earth 55. The ROV 35A is coupled to the first vessel 5 by a tether 46A and an umbilical cable 44A that provides power, communications, and control to the ROV 35A. A tether management system (TMS) 50A is also coupled between the umbilical cable 44A and the tether 46A. The TMS 50A may be utilized as an intermediary, subsurface platform from which to operate the ROV 35A. For most ROV 35A operations at or near the seabed 55, the TMS 50A can be positioned approximately 50 feet above seabed 55 and can pay out tether 46A as needed for ROV 35A to move freely above seabed 55 in order to position and transfer seismic sensor devices 30 thereon.

A crane 25B may be coupled (e.g., via a latch, anchor, nuts and bolts, screw, suction cup, magnet, or other fastener) to a stern of the first vessel 5, or other locations on the first vessel 5. Each of the cranes 25A, 25B may be any lifting device or launch and recovery system (LARS) adapted to operate in a marine environment. The crane 25B can be coupled to a seismic sensor transfer device 100 by a cable 70. The transfer device 100 may be a drone, a skid structure, a basket, or any device capable of housing one or more sensor devices 30 therein. The transfer device 100 may be a structure configured as a magazine adapted to house and transport one or more sensor devices 30. The transfer device 100 may include an on-board power supply, a motor or gearbox, or a propulsion system 105. The transfer device 100 can be configured as a sensor device storage rack for transfer of sensor devices 30 from the first vessel 5 to the ROV 35A, and from the ROV 35A to the first vessel 5. The transfer device 100 may include an on-board power supply, a motor or gearbox, or a propulsion system 105. Alternatively, the transfer device 100 may not include any integral power devices or not require any external or internal power source. The cable 70 can provide power or control to the transfer device 100. Alternatively, the cable 70 may be an umbilical, a tether, a cord, a wire, a rope, and the like, that is configured solely for support of the transfer device 100.

The ROV 35A can include a seismic sensor device storage compartment 40 that is configured to store one or more seismic sensor devices 30 (e.g., first devices 102) therein for a deployment or retrieval operation. The storage compartment 40 may include a magazine, a rack, or a container configured to store the seismic sensor devices. The storage compartment 40 may also include a conveyor, such as a movable platform having the seismic sensor devices thereon, such as a carousel or linear platform configured to support and move the seismic sensor devices 30 therein. The seismic sensor devices 30 can be deployed on the seabed 55 and retrieved therefrom by operation of the movable platform. The ROV 35A may be positioned at a predetermined location above or on the seabed 55 and seismic sensor devices 30 are rolled, conveyed, or otherwise moved out of the storage compartment 40 at the predetermined location. The seismic sensor devices 30 can be deployed and retrieved from the storage compartment 40 by a robotic device 60, such as a robotic arm, an end effector or a manipulator, disposed on the ROV 35A.

The seismic sensor device 30 may be referred to as seismic data acquisition unit 30 or node 30 or first device 102. The seismic data acquisition unit 30 can record seismic data. The seismic data acquisition unit 30 may include one or more of at least one geophone, at least one hydrophone, at least one power source (e.g., a battery, external solar panel), at least one clock, at least one tilt meter, at least one environmental sensor, at least one seismic data recorder, at least global positioning system sensor, at least one wireless or wired transmitter, at least one wireless or wired receiver, at least one wireless or wired transceiver, or at least one processor. The seismic sensor device 30 may be a self-contained unit such that all electronic connections are within the unit, or one or more components can be external to the seismic sensor device 30. During recording, the seismic sensor device 30 may operate in a self-contained manner such that the node does not require external communication or control. The seismic sensor device 30 may include several geophones and hydrophones configured to detect acoustic waves that are reflected by subsurface lithological formation or hydrocarbon deposits. The seismic sensor device 30 may further include one or more geophones that are configured to vibrate the seismic sensor device 30 or a portion of the seismic sensor device 30 in order to detect a degree of coupling between a surface of the seismic sensor device 30 and a ground surface. One or more component of the seismic sensor device 30 may attach to a gimbaled platform having multiple degrees of freedom. For example, the clock may be attached to the gimbaled platform to minimize the effects of gravity on the clock.

For example, in a deployment operation, a first plurality of seismic sensor devices, comprising one or more sensor devices 30, may be loaded into the storage compartment 40 while on the first vessel 5 in a pre-loading operation. The ROV 35A, having the storage compartment coupled thereto, is then lowered to a subsurface position in the water column 15. The ROV 35A utilizes commands from personnel on the first vessel 5 to operate along a course to transfer the first plurality of seismic sensor devices 30 from the storage compartment 40 and deploy the individual sensor devices 30 at selected locations on the seabed 55. Once the storage compartment 40 is depleted of the first plurality of seismic sensor devices 30, the transfer device 100 is used to ferry a second plurality of seismic sensor devices 30 as a payload from first vessel 5 to the ROV 35A.

The transfer system 100 may be preloaded with a second plurality of seismic sensor devices 30 while on or adjacent the first vessel 5. When a suitable number of seismic sensor devices 30 are loaded onto the transfer device 100, the transfer device 100 may be lowered by crane 25B to a selected depth in the water column 15. The ROV 35A and transfer device 100 are mated at a subsurface location to allow transfer of the second plurality of seismic sensor devices 30 from the transfer device 100 to the storage compartment 40. When the transfer device 100 and ROV 35A are mated, the second plurality of seismic sensor devices 30 contained in the transfer device 100 are transferred to the storage compartment 40 of the ROV 35A. Once the storage compartment 40 is reloaded, the ROV 35A and transfer device 100 are detached or unmated and seismic sensor device placement by ROV 35A may resume. Reloading of the storage compartment 40 can be provided while the first vessel 5 is in motion. If the transfer device 100 is empty after transfer of the second plurality of seismic sensor devices 30, the transfer device 100 may be raised by the crane 25B to the vessel 5 where a reloading operation replenishes the transfer device 100 with a third plurality of seismic sensor devices 30. The transfer device 100 may then be lowered to a selected depth when the storage compartment 40 is reloaded. This process may repeat as until a desired number of seismic sensor devices 30 have been deployed.

Using the transfer device 100 to reload the ROV 35A at a subsurface location reduces the time required to place the seismic sensor devices 30 on the seabed 55, or "planting" time, as the ROV 35A is not raised and lowered to the surface 10 for seismic sensor device reloading. The ROV 35A can synchronize a clock of the node 30 at the time of planting. Further, mechanical stresses placed on equipment utilized to lift and lower the ROV 35A are minimized as the ROV 35A may be operated below the surface 10 for longer periods. The reduced lifting and lowering of the ROV 35A may be particularly advantageous in foul weather or rough sea conditions. Thus, the lifetime of equipment may be enhanced as the ROV 35A and related equipment are not raised above surface 10, which may cause the ROV 35A and related equipment to be damaged, or pose a risk of injury to the vessel personnel.

Likewise, in a retrieval operation, the ROV 35A can utilize commands from personnel on the first vessel 5 to retrieve each seismic sensor device 30 that was previously placed on seabed 55, or collect data from the seismic sensor device 30 without retrieving the device 30. The ROV 35A can adjust the clock of the device 30 while collecting the seismic data. The retrieved seismic sensor devices 30 are placed into the storage compartment 40 of the ROV 35A. In some implementations, the ROV 35A may be sequentially positioned adjacent each seismic sensor device 30 on the seabed 55 and the seismic sensor devices 30 are rolled, conveyed, or otherwise moved from the seabed 55 to the storage compartment 40. The seismic sensor devices 30 can be retrieved from the seabed 55 by a robotic device 60 disposed on the ROV 35A.

Once the storage compartment 40 is full or contains a pre-determined number of seismic sensor devices 30, the transfer device 100 is lowered to a position below the surface 10 and mated with the ROV 35A. The transfer device 100 may be lowered by crane 25B to a selected depth in the water column 15, and the ROV 35A and transfer device 100 are mated at a subsurface location. Once mated, the retrieved seismic sensor devices 30 contained in the storage compartment 40 are transferred to the transfer device 100. Once the storage compartment 40 is depleted of retrieved sensor devices, the ROV 35A and transfer device 100 are detached and sensor device retrieval by ROV 35A may resume. Thus, the transfer device 100 is used to ferry the retrieved seismic sensor devices 30 as a payload to the first vessel 5, allowing the ROV 35A to continue collection of the seismic sensor devices 30 from the seabed 55. In this manner, sensor device retrieval time is significantly reduced as the ROV 35A is not raised and lowered for sensor device unloading. Further, safety issues and mechanical stresses placed on equipment related to the ROV 35A are minimized as the ROV 35A may be subsurface for longer periods.

For example, the first vessel 5 can travel in a first direction 75, such as in the +X direction, which may be a compass heading or other linear or predetermined direction. The first direction 75 may also account for or include drift caused by wave action, current(s) or wind speed and direction. The plurality of seismic sensor devices 30 can be placed on the seabed 55 in selected locations, such as a plurality of rows Rn in the X direction (R1 and R2 are shown) or columns Cn in the Y direction (C1-Cn are shown), wherein n equals an integer. The rows Rn and columns Cn can define a grid or array, wherein each row Rn (e.g., R1-R2) comprises a receiver line in the width of a sensor array (X direction) or each column Cn comprises a receiver line in a length of the sensor array (Y direction). The distance between adjacent sensor devices 30 in the rows is shown as distance LR and the distance between adjacent sensor devices 30 in the columns is shown as distance LC. While a substantially square pattern is shown, other patterns may be formed on the seabed 55. Other patterns include non-linear receiver lines or non-square patterns. The pattern(s) may be pre-determined or result from other factors, such as topography of the seabed 55. The distances LR and LC can be substantially equal and may include dimensions between about 60 meters to about 400 meters, or greater. The distance between adjacent seismic sensor devices 30 may be predetermined or result from topography of the seabed 55 as described above.

The first vessel 5 is operated at a speed, such as an allowable or safe speed for operation of the first vessel 5 and any equipment being towed by the first vessel 5. The speed may take into account any weather conditions, such as wind speed and wave action, as well as currents in the water column 15. The speed of the vessel may also be determined by any operations equipment that is suspended by, attached to, or otherwise being towed by the first vessel 5. For example, the speed can be limited by the drag coefficients of components of the ROV 35A, such as the TMS 50A and umbilical cable 44A, as well as any weather conditions or currents in the water column 15. As the components of the ROV 35A are subject to drag that is dependent on the depth of the components in the water column 15, the first vessel speed may operate in a range of less than about 1 knot. In examples where two receiver lines (rows R1 and R2) are being laid, the first vessel includes a first speed of between about 0.2 knots and about 0.6 knots. In some implementations, the first speed includes an average speed of between about 0.25 knots, which includes intermittent speeds of less than 0.25 knots and speeds greater than about 1 knot, depending on weather conditions, such as wave action, wind speeds, or currents in the water column 15.

During a seismic survey, one receiver line, such as row R1 may be deployed. When the single receiver line is completed a second vessel 80 can be used to provide a source signal. In some cases, the first vessel or other device can provide the source signal. The second vessel 80 is provided with a source device or acoustic source device 85, which may be a device capable of producing acoustical signals or vibrational signals suitable for obtaining the survey data. The source signal propagates to the seabed 55 and a portion of the signal is reflected back to the seismic sensor devices 30. The second vessel 80 may be required to make multiple passes, for example at least four passes, per a single receiver line (row R1 in this example). During the time the second vessel 80 is making the passes, the first vessel 5 continues deployment of a second receiver line. However, the time involved in making the passes by the second vessel 80 is much shorter than the deployment time of the second receiver line. This causes a lag time in the seismic survey as the second vessel 80 sits idle while the first vessel 5 is completing the second receiver line.

The first vessel 5 can use one ROV 35A to lay sensor devices to form a first set of two receiver lines (rows R1 and R2) in any number of columns, which may produce a length of each receiver line of up to and including several miles. The two receiver lines (rows R1 and R2) can be substantially (e.g., within +/−10 degrees) parallel. When a single directional pass of the first vessel 5 is completed and the first set (rows R1, R2) of seismic sensor devices 30 are laid to a predetermined length, the second vessel 80, provided with the source device 85, is utilized to provide the source signal. The second vessel 80 can make eight or more passes along the two receiver lines to complete the seismic survey of the two rows R1 and R2.

While the second vessel 80 is shooting along the two rows R1 and R2, the first vessel 5 may turn 180 degrees and travel in the X direction in order to lay seismic sensor devices 30 in another two rows adjacent the rows R1 and R2, thereby forming a second set of two receiver lines. The second vessel 80 may then make another series of passes along the second set of receiver lines while the first vessel 5 turns 180 degrees to travel in the +X direction to lay another set of receiver lines. The process may repeat until a specified area of the seabed 55 has been surveyed. Thus, the idle time of the second vessel 80 is minimized as the deployment time for laying receiver lines is cut approximately in half by deploying two rows in one pass of the vessel 5.

Although only two rows R1 and R2 are shown, the sensor device 30 layout is not limited to this configuration as the ROV 35A may be adapted to layout more than two rows of sensor devices in a single directional tow. For example, the ROV 35A may be controlled to lay out between three and six rows of sensor devices 30, or an even greater number of rows in a single directional tow. The width of a "one pass" run of the first vessel 5 to layout the width of the sensor array can be limited by the length of the tether 46A or the spacing (distance LR) between sensor devices 30.

Figure 6:
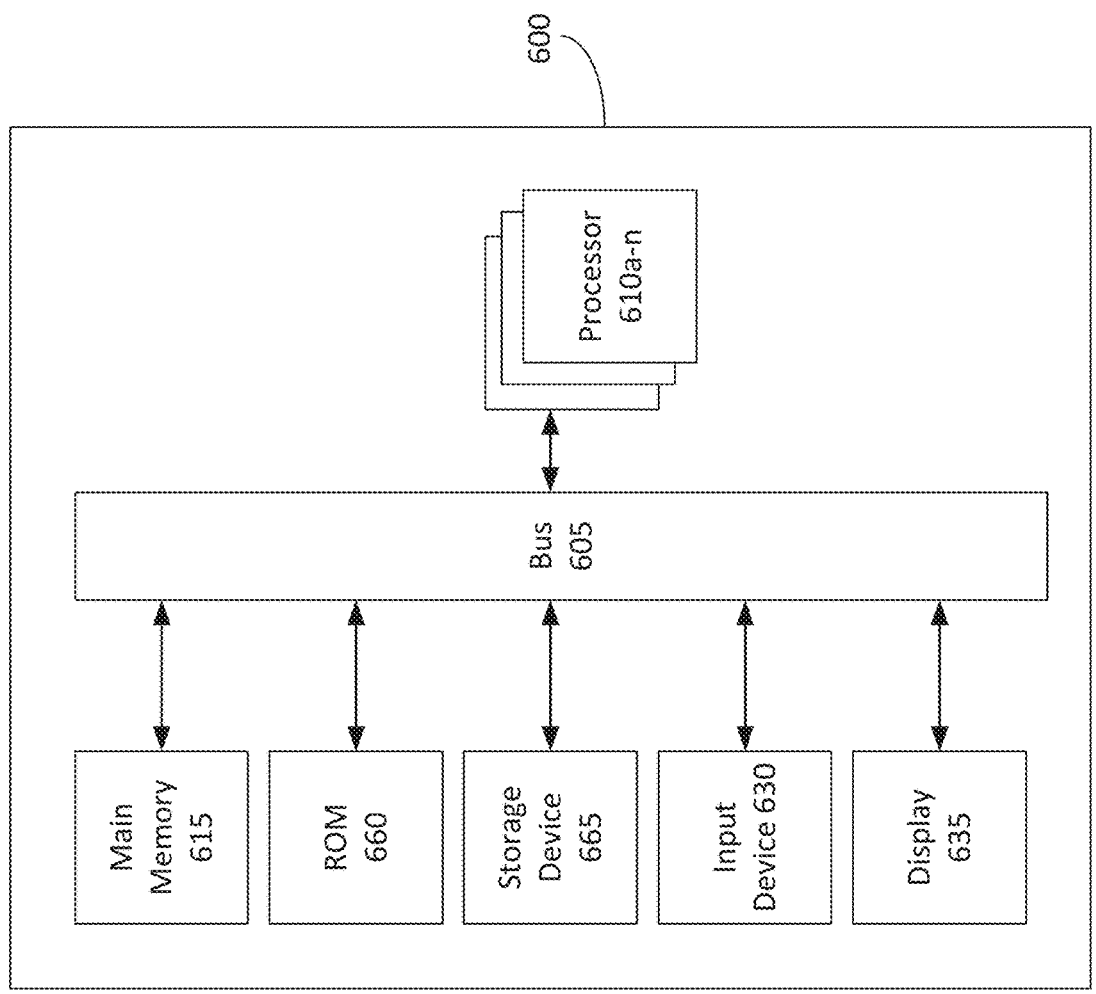
FIG. 6 depicts a block diagram of an architecture for a computing system employed to implement various elements of the system depicted in FIG. 1, to perform the method depicted in FIG. 3, or generate the images depicted in FIG. 4, in accordance with an implementation.

FIG. 6 depicts a block diagram of an architecture for a computing system employed to implement various elements of the system depicted in FIG. 1, to perform the method depicted in FIG. 3, or generate the image depicted in FIG. 4. FIG. 6 is a block diagram of a data processing system including a computer system 600 in accordance with an embodiment. The computer system can include or execute a coherency filter component. The data processing system, computer system or computing device 600 can be used to implement one or more component configured to filter, translate, transform, generate, analyze, or otherwise process the data or signals depicted in FIGS. 4-6. The computing system 600 includes a bus 605 or other communication component for communicating information and a processor 610a-n or processing circuit coupled to the bus 605 for processing information. The computing system 600 can also include one or more processors 610 or processing circuits coupled to the bus for processing information. The computing system 600 also includes main memory 615, such as a random access memory (RAM) or other dynamic storage device, coupled to the bus 605 for storing information, and instructions to be executed by the processor 610. Main memory 615 can also be used for storing seismic data, time gating function data, temporal windows, images, reports, executable code, temporary variables, or other intermediate information during execution of instructions by the processor 610. The computing system 600 may further include a read only memory (ROM) 620 or other static storage device coupled to the bus 605 for storing static information and instructions for the processor 610. A storage device 625, such as a solid state device, magnetic disk or optical disk, is coupled to the bus 605 for persistently storing information and instructions.

The computing system 600 may be coupled via the bus 605 to a display 635 or display device, such as a liquid crystal display, or active matrix display, for displaying information to a user. An input device 630, such as a keyboard including alphanumeric and other keys, may be coupled to the bus 605 for communicating information and command selections to the processor 610. The input device 630 can include a touch screen display 635. The input device 630 can also include a cursor control, such as a mouse, a trackball, or cursor direction keys, for communicating direction information and command selections to the processor 610 and for controlling cursor movement on the display 635.

The processes, systems and methods described herein can be implemented by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement may also be employed to execute the instructions contained in main memory 615. In some embodiments, hard-wired circuitry may be used in place of or in combination with software instructions to effect illustrative implementations. Thus, embodiments are not limited to any specific combination of hardware circuitry and software.

Although an example computing system has been described in FIG. 8, embodiments of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources. The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, microprocessors, and any one or more processors of a digital computer. A processor can receive instructions and data from a read only memory or a random access memory or both. The elements of a computer are a processor for performing actions in accordance with instructions and one or more memory devices for storing instructions and data. A computer can include, or be operatively coupled to receive data from or transfer data to, or both, one or more mass storage devices for storing data, e.g., magnetic, magneto optical disks, or optical disks. A computer need not have such devices. Moreover, a computer can be embedded in another device, e.g., a personal digital assistant (PDA), a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The implementations described herein can be implemented in any of numerous ways including, for example, using hardware, software or a combination thereof. When implemented in software, the software code can be executed on any suitable processor or collection of processors, whether provided in a single computer or distributed among multiple computers.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to or receive communications from other devices. The display unit(s) may be provided, for example, to allow a user to view various information in connection with execution of the instructions. The user input device(s) may be provided, for example, to allow the user to make manual adjustments, make selections, enter data or various other information, or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the solution discussed above. The computer readable medium or media can be transportable, such that the program or programs stored thereon can be loaded onto one or more different computers or other processors to implement various aspects of the present solution as discussed above.

The terms "program" or "software" are used herein to refer to any type of computer code or set of computer-executable instructions that can be employed to program a computer or other processor to implement various aspects of embodiments as discussed above. One or more computer programs that when executed perform methods of the present solution need not reside on a single computer or processor, but may be distributed in a modular fashion amongst a number of different computers or processors to implement various aspects of the present solution.

Computer-executable instructions may be in many forms, such as program modules, executed by one or more computers or other devices. Program modules can include routines, programs, objects, components, data structures, or other components that perform particular tasks or implement particular abstract data types. The functionality of the program modules can be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Elements other than 'A' and 'B' can also be included.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system of seismic data collection, comprising:
a first string of one or more acoustic sources and a second string of one or more acoustic sources;
the first string of acoustic sources to trigger a shot on alternating acoustic sources of the first string of acoustic sources; and
the second string of acoustic sources to trigger a shot on alternating acoustic sources of the second string that are opposite acoustic sources on the first string of acoustic sources that are in standby;
a first one or more hydrophones;
a second one or more hydrophones;
the first one or more hydrophones to record an acoustic shot generated from a source on the first string of one or more acoustic sources;
the second one or more hydrophones to record the acoustic shot and acoustic reflections corresponding to the acoustic shot that are reflected by a subsurface lithologic formation of a seabed toward the second one or more hydrophones;
wherein the acoustic shot recorded by the first one or more hydrophones, the acoustic shot recorded by the second one or more hydrophones, and the acoustic reflections recorded by the second one or more hydrophones include seismic data; and
a data processing system comprising an image generation unit configured to generate an image from the seismic data that includes the acoustic shot and the acoustic reflections, wherein, in an event of recording of the acoustic reflections, the second one or more hydrophones are located above a first source that is in standby and opposite to a second source that fires to generate the image.

2. The system of claim 1, comprising:
a separate hydrophone, among the first one or more hydrophones, is mounted within a predetermined distance of each acoustic source of the first string of one or more acoustic sources.

3. The system of claim 1, wherein the data processing system identifies a characteristic of the source from the acoustic shot recorded by the first one or more hydrophones.

4. The system of claim 1, wherein the data processing system identifies a characteristic of the source from the acoustic shot recorded by the second one or more hydrophones.

5. The system of claim 1, comprising:
the first one or more hydrophones located less than or equal to 2 meters above at least one source on the first string of acoustic sources.

6. The system of claim 1, comprising:
the second one or more hydrophones located less than or equal to 2 meters above at least one source on the second string of acoustic sources.

7. The system of claim 1, comprising:
the second one or more hydrophones to generate a recording comprising the acoustic shot and the acoustic reflections corresponding to the acoustic shot, wherein a duration of the recording is at least 1 second.

8. The system of claim 1, wherein the data processing system generates, based on the acoustic reflections absent the acoustic shot, the image, the image indicating a portion of earth below the first string of acoustic sources and the second string of acoustic sources.

9. The system of claim 1, wherein the data processing system generates the image, the image indicating a portion of earth between receiver stations, the portion of the earth being within 1000 meters of an ocean bottom.

10. The system of claim 1, wherein the data processing system identifies, from the image, wherein the image is generated based on the acoustic reflections absent the acoustic shot, a subsea feature.

11. The system of claim 1, comprising:
a third hydrophone located below the first string of acoustic sources; and
a fourth hydrophone located below the second string of acoustic sources.

12. The system of claim 1, comprising:
the one or more acoustic sources configured to operate in a flip flop dual source mode.

13. The system of claim 1, comprising:
the first string of acoustic sources having a first acoustic source, a second acoustic source adjacent to the first acoustic source, and a third acoustic source adjacent to the second acoustic source, the third acoustic source not adjacent to the first acoustic source; and
the second string of acoustic sources having a fourth acoustic source, a fifth acoustic source adjacent to the fourth acoustic source, and a sixth acoustic source adjacent to the fifth acoustic source, the sixth acoustic source not adjacent to the fourth acoustic source.

14. The system of claim 1, comprising:
the first string of acoustic sources having a first acoustic source and a second acoustic source adjacent to the first acoustic source;
the second string of acoustic sources having a third acoustic source and a fourth acoustic source adjacent to the third acoustic source,
wherein:
the first acoustic source is separated from the second acoustic source by at least 50 meters;
the third acoustic source is separated from the fourth acoustic source by at least 50 meters; and
any acoustic source on the first string of acoustic sources is separated from any acoustic source on the second string of acoustic sources by at least 50 meters.

15. The system of claim 1, wherein the data processing system:
receives seismic data corresponding to the acoustic shot and the acoustic reflections recorded by the second one or more hydrophones; and
generates the image from the acoustic shot and the acoustic reflections with the seismic data recorded by the second one or more hydrophones mounted within the distance from the second string of one or more acoustic sources.

16. A method of seismic data collection, comprising:
providing a first string of one or more acoustic sources and a second string of one or more acoustic sources;
the first string of acoustic sources to trigger a shot on alternating acoustic sources of the first string of acoustic sources; and
the second string of acoustic sources to trigger a shot on alternating acoustic sources of the second string that are opposite acoustic sources on the first string of acoustic sources that are in standby;
providing a first one or more hydrophones;
providing a second one or more hydrophones;
recording, by the first one or more hydrophones, an acoustic shot generated from a source on the first string of one or more acoustic sources;
recording, by the second one or more hydrophones, the acoustic shot;
recording, by the second one or more hydrophones, acoustic reflections corresponding to the acoustic shot that are reflected by a subsurface lithologic formation of a seabed toward the second one or more hydrophones,
wherein the acoustic shot recorded by the first one or more hydrophones, the acoustic shot recorded by the second one or more hydrophones, and the acoustic reflections recorded by the second one or more hydrophones include seismic data; and
generating an image from the seismic data that includes the acoustic shot and the acoustic reflections, wherein, in an event of recording of the acoustic reflections, the second one or more hydrophones are located above a first source that is in standby and opposite to a second source that fires to generate the image.

17. The method of claim 16, comprising:
identifying, by a data processing system, a characteristic of the source from the acoustic shot recorded by the second one or more hydrophones.

18. The method of claim 16, comprising:
generating, by the second one or more hydrophones, a recording comprising the acoustic shot and the acoustic reflections corresponding to the acoustic shot, wherein a duration of the recording is at least 2 seconds.

19. The method of claim 16, comprising:
generating, by a data processing system based on the acoustic reflections absent the acoustic shot, the image, wherein the image indicates a portion of earth below the first string of one or more acoustic sources and the second string of one or more acoustic sources.

20. The method of claim 16, comprising:
generating, by a data processing system, the image, wherein the image indicates a portion of earth between receiver stations, the portion of the earth being within 1000 meters of an ocean bottom.

\* \* \* \* \*